US012755097B2

(12) United States Patent
Csaki et al.

(10) Patent No.: US 12,755,097 B2
(45) Date of Patent: Oct. 6, 2026

(54) FEW-SHOT TRAINING OF TRANSFORMER LANGUAGE MODEL FROM A SUBSET OF PROMPT COMPLETION

(71) Applicant: SambaNova Systems, Inc., Palo Alto, CA (US)

(72) Inventors: Zoltan Csaki, Palo Alto, CA (US); Bo Li, Foster City, CA (US); Urmish Ajit Thakker, Leander, TX (US); Venkat Krishna Srinivasan, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 224 days.

(21) Appl. No.: 18/387,445

(22) Filed: Nov. 6, 2023

(65) Prior Publication Data

US 2025/0148205 A1 May 8, 2025

(51) Int. Cl.
*G06F 40/284* (2020.01)
*G06N 3/08* (2023.01)
*G06N 3/0895* (2023.01)

(52) U.S. Cl.
CPC .................................. *G06F 40/284* (2020.01)

(58) Field of Classification Search
CPC .... G06F 40/279; G06F 40/284; G06F 40/289; G06F 40/30; G06N 3/0455; G06N 3/08; G06N 3/084; G06N 3/0895
(Continued)

(56) References Cited

U.S. PATENT DOCUMENTS 11,748,567 B2 * 9/2023 Li ........................ G06N 3/0895 704/9
2020/0202172 A1 * 6/2020 Herranen ............... G06N 3/084
(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.
M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
(Continued)

*Primary Examiner* — Martin Lerner
(74) *Attorney, Agent, or Firm* — FP; Fang Chen; Sikander M. Khan

(57) ABSTRACT

Embodiments described herein provide systems and techniques for training large language models. In one aspect, a process for performing in-context few-shot training for a transformer-based language model is disclosed. This process may begin by receiving the transformer-based language model having a context window of a predetermined size, as well as a training dataset comprising a set of prompt/completion examples. The process then constructs a training sequence based on the training dataset. Next, the process performs a single forward pass using the training sequence as input. The process subsequently performs a set of backward passes from a subset of examples in the training sequence, wherein each backward pass is conditioned on a selected subset of prompt/completion examples in the training sequence. Performing multiple backward passes conditioned on selected prompt/completion examples improves the language model's ability to generate a higher quality conditional probability distribution for next token without incurring additional training time.

16 Claims, 7 Drawing Sheets

(58) Field of Classification Search
USPC .......................... 704/1, 9; 706/12, 15, 16, 24
See application file for complete search history.

(56) References Cited

U.S. PATENT DOCUMENTS

| | | | | |
|---|---|---|---|---|
| 2021/0027770 | A1* | 1/2021 | Olabiyi | G06F 40/30 |
| 2021/0232753 | A1* | 7/2021 | He | G06N 3/08 |
| 2021/0232773 | A1* | 7/2021 | Wang | G06F 40/284 |
| 2021/0374603 | A1* | 12/2021 | Xia | G06N 3/08 |
| 2022/0012425 | A1* | 1/2022 | Li | G06F 40/30 |
| 2022/0164346 | A1* | 5/2022 | Mitra | G06N 3/045 |
| 2022/0180071 | A1* | 6/2022 | Chung | G06F 40/284 |
| 2022/0382978 | A1* | 12/2022 | Wagner | G06F 40/284 |
| 2023/0103997 | A1* | 4/2023 | Li | G06V 10/761<br>382/156 |
| 2024/0095504 | A1* | 3/2024 | Das | G06N 3/08 |
| 2024/0265235 | A1* | 8/2024 | Sakai | G06N 3/044 |
| 2024/0290332 | A1* | 8/2024 | Shim | G10L 15/16 |
| 2024/0311272 | A1* | 9/2024 | Schaefer | G06N 3/045 |
| 2024/0386066 | A1* | 11/2024 | Sun | G06N 3/045 |
| 2024/0419912 | A1* | 12/2024 | Somech | G06F 40/279 |
| 2025/0077870 | A1* | 3/2025 | Mueller | G06N 3/084 |
| 2025/0148276 | A1* | 5/2025 | Csaki | G06N 3/084 |

OTHER PUBLICATIONS

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

FEW-SHOT TRAINING OF TRANSFORMER LANGUAGE MODEL FROM A SUBSET OF PROMPT COMPLETION

FIELD OF THE TECHNOLOGY DISCLOSED

The disclosed embodiments generally relate to building large language models for deep-learning applications. More specifically, the disclosed embodiments relate to combining in-context learning and instruction tuning to enhance large language models' abilities to following human instructions.

BACKGROUND

Large language models have the ability to respond to prompts that it was never trained on. In-context learning improves this performance by providing example prompts and completions in a given language model's context window, and then providing desired prompt that the user wants to be answered afterwards. This process allows the language model to learn on the format the user desires the prompt to be answered in.

When a language model is designed to answer questions, e.g., when the model is prompted with a question "what is the capital of France," you want the language model to answer the question like a human, instead of generating more of the similar questions/thoughts that the users have provided, e.g., "what is the capital of the UK?" or "what is the capital of Japan?" One existing technique to align the language model with human behaviors is referred to as "instruction tuning," which is used to "teach" the model to follow the prepared instructions, and subsequently to perform new and unseen tasks based on instructions that the model has not seen in the past. For example, the instructions can be question/answer pairs, wherein the model is first provided with certain questions, e.g., "what is the capital of France?" and then the model is exclusively trained on the correct answers to those questions, e.g., "Paris." Through this "tuning" process, the model learns that it needs to generate the answer to the question rather than generating new questions (unless explicitly specified by the instructions). The instruction tuning approach is more reliable and more robust, and the trained model can yield better inference results. Note that while the tuned model through the instruction tuning approach can yield better inference results, the tuned model also loses a degree of generalizability.

Another existing technique to infuse a language model with desired behaviors is referred to as "in-context learning." There are a number of ways to subject a language model to in-context learning. In a classic in-context learning scheme, also referred to as "few-shot learning" or "few-shot prompting," one or more similar question/answer or prompt/completion examples are provided in the prompt, and the model (which is generally pre-trained) is expected to answer a final question of the same style in the prompt by making a direct inference after seeing the examples in the prompt (i.e., in context examples). For example, the exemplary question/answer pairs and the final prompt can have the following configuration:

Please answer the following question: What is the capital of Germany? Answer: Berlin Please answer the following question: What is the capital of France? Answer: Paris Please answer the following question: What is the capital of Brazil? Answer: Brasilia Please answer the following question: What is the capital of Nepal? Answer:

In the few-shot in-context learning example above, the model is expected to answer the final prompt correctly because the model has seen multiple (i.e., three) examples in the same context that are configured in the style of the answer the user is looking for. Generally speaking, few-shot in-context learning can improve the performance of language models without requiring model training/fine-tuning or changing the model weights and biases. At the same time, in-context learning can achieve the goal of infusing the intended behaviors into the language model. Compared to instruction tuning, in-context learning has significantly less computational cost than using instruction tuning because model parameter updates are not required, and the learned model can maintain a level of generalizability. However, the learned model has the drawbacks of being less stable and less reliable. Moreover, prompt design (also referred to as "prompt engineering") is crucial to ensure in-context learning performances. Thus, prompt engineering for in-context learning requires significant human efforts that involve heavy experimentations and heuristics to adapt to specific tasks.

Hence, what is needed is a language model construction technique that can leverage the benefits of both instruction tuning and in-context learning without the drawbacks of these techniques.

SUMMARY

Disclosed are various examples of a language model (LM) training technique, referred to as "all-shot" training that employs a form of in-context learning to teach the model to learn "how to learn in context" by providing the model with as many different numbers of possible examples in the context of a given target task. In some embodiments, the disclosed in-context learning provides as many examples as allowed by the "context window" as the context to the model, wherein the examples are configured such that the model only learns the completions of every example, while attending to the entire context. More specifically, the disclosed learning scheme causes the first example with no other examples in context to be learned in a zero-shot fashion; the second, i.e., the subsequent example to be learned in a 1-shot fashion, because there is one example, and therefore the model sees one example in the context before the first example; the third, i.e., the subsequent example following the second example to be learned in a 2-shot fashion, because there are two and therefore the model sees two examples in the context before the third example, and so forth. This means that the Nth example is learned in a (N-1)-shot manner, because there are (N-1) and therefore the model sees (N-1) examples before the Nth example.

Comparing with existing in-context learning approaches, such as the "meta in-context learning" approach by Facebook™ (also referred to as "meta-ICL" hereinafter), the disclosed all-shot training provides a number of advantages:

- The disclosed all-shot training is significantly more efficient, because the training process is designed to learn most or all of the examples provided for the associated in-context learning. In contrast, the meta-ICL or suffix loss only train on a subset of the prompts/completions provided for the associated in-context learning. Note that if k prompt/completion examples can be fitted in the maximum sequence length of a model (i.e., the size of the model "context window"), then the disclosed all-shot training can be k times more efficient than that of the meta-ICL;

The disclosed all-shot training teaches the language model to learn to perform well with a full range of possible number of examples that can be used in the context (e.g., within a given context window). In other words, the trained model will perform well regardless of the number of examples provided in the context. This ability allows the applicability and usage of the trained model to be extremely flexible. In contrast, the meta-ICL trained model will perform well only for a small set of possible number of examples, thereby significantly limiting the applicability and usage of the meta-ICL trained model;

The disclosed all-shot training is not intended to learn or train on prompt examples. In contrast, Suffix Loss is able to generalize to learn many different numbers of prompts but suffers from training on the prompt examples;

The disclosed all-shot training can perform equally well or better than the meta-ICL, with generalizability to the number of shots you can evaluate with, and more efficiency The disclosed all-shot training can prepare training data in a desired and consistent format (e.g., by converting input text to numbers) that the model can directly learn on with a specialized data preparation infrastructure (e.g., implemented through GitHub repository).

In one aspect, a process for performing in-context few-shot training for a transformer-based language model is disclosed. This process may begin by receiving the transformer-based language model having a context window of a predetermined size, as well as receiving a training dataset comprising a set of K prompt/completion examples. The process then constructs a first training sequence based on the training dataset. Next, the process performs a single forward pass using the first training sequence as input. The process subsequently performs a set of backward passes from a subset of examples in the first training sequence, wherein each backward pass is conditioned on a selected subset of prompt/completion examples in the first training sequence. Note that performing multiple backward passes conditioned on the selected prompt/completion examples in the first training sequence improves the language model's ability to generate a higher quality conditional probability distribution for a next token without incurring additional training time.

In some embodiments, the process constructs the first training sequence based on the training dataset by selecting from the set of K prompt/completion examples, a set of N prompt/completion examples, wherein N's K and the combined size of the selected N prompt/completion examples is equal to or less than the predetermined size of the context window. The process then concatenates the selected set of N prompt/completion examples to form the first training sequence.

In some embodiments, the process performs the single forward pass using the first training sequence by first calling the transformer-based language model. The process then passes the first training sequence through the transformer-based language model to generate a next token prediction based on the first training sequence.

In some embodiments, while performing the single forward pass, the process specifies a set of loss masks within the training sequence for the set of backward passes, wherein each loss mask in the set of loss masks is a unique example in the set of N prompt/completion examples to begin a backward pass. Concurrently, the process specifies a set of attention masks for the set of loss masks. Note that each attention mask in the set of attention masks specifies, during a backward pass from a corresponding loss mask, a subset of prompt/completion examples within the training sequence for the backward pass to be conditioned on.

In some embodiments, each loss mask in the set of loss masks is one of the N completions in the set of N prompt/completion examples. Moreover, the set of loss masks is composed of a subset of the N completions in the set of N prompt/completion examples.

In some embodiments, the set of loss masks is composed of the set N completions in the set of N prompt/completion examples.

In some embodiments, a specified attention mask for a corresponding loss mask includes each and every prompt/completion example in the first training sequence preceding the corresponding loss mask.

In some embodiments, a specified attention mask for a corresponding loss mask includes both a first subset of prompt/completion examples in the first training sequence preceding the corresponding loss mask and a second subset of prompt/completion examples in the first training sequence succeeding the corresponding loss mask.

In some embodiments, the process performs a backward pass in the set of backward passes by performing a backpropagation from a corresponding loss mask conditioned on each and every prompt/completion example in the first training sequence preceding the corresponding loss mask, thereby effectively performing a few-shot training on the corresponding loss mask.

In some embodiments, the set of backward passes includes N backward passes, and each of the N backward passes includes performing a backpropagation from each of the N completions in the set of N prompt/completion examples conditioned on each and every prompt/completion example in the first training sequence preceding the corresponding completion, thereby performing multiple different few-shot trainings on the set of loss masks.

In some embodiments, after performing the set of backward passes using the first training sequence, the process determines if there are unselected prompt/completion examples in the training dataset after constructing the first training sequence. In response to determining that there are unselected prompt/completion examples, the process further (1) constructs a second training sequence from the unselected prompt/completion examples in the set of K prompt/completion examples; and (2) performing a second training pass based the second training sequence.

In some embodiments, the process performs the second training pass by: (1) performing a single forward pass using the second training sequence as input; and (2) performing a set of backward passes from a subset of examples in the second training sequence, wherein each backward pass is conditioned on a selected subset of prompt/completion examples in the second training sequence.

In some embodiments, a total training time for the transformer-based language model based on the training dataset is proportional to a number of forward passes, which is determined by a number of unique training sequences constructed from the training dataset.

In some embodiments, the process reduces the total training time by reducing the number of unique training sequences. Moreover, the process can reduce the number of unique training sequences by maximizing the usage of the context window.

In another aspect, a system for performing in-context few-shot training for a transformer-based language model is disclosed. This system includes one or more processors and a memory coupled to the one or more processors. Moreover, the memory stores instructions that, when executed by the one or more processors, cause the system to: (1) receive the transformer-based language model having a context window of a predetermined size; (2) receive a training dataset comprising a set of K prompt/completion examples; (3) construct a first training sequence based on the training dataset; (4) perform a single forward pass using the first training sequence as input; and (5) perform a set of backward passes from a subset of examples in the first training sequence, wherein each backward pass is conditioned on a selected subset of prompt/completion examples in the first training sequence. Note that performing multiple backward passes conditioned on the selected prompt/completion examples in the first training sequence improves the language model's ability to generate a higher quality conditional probability distribution for a next token without incurring additional training time.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

Figure 1:
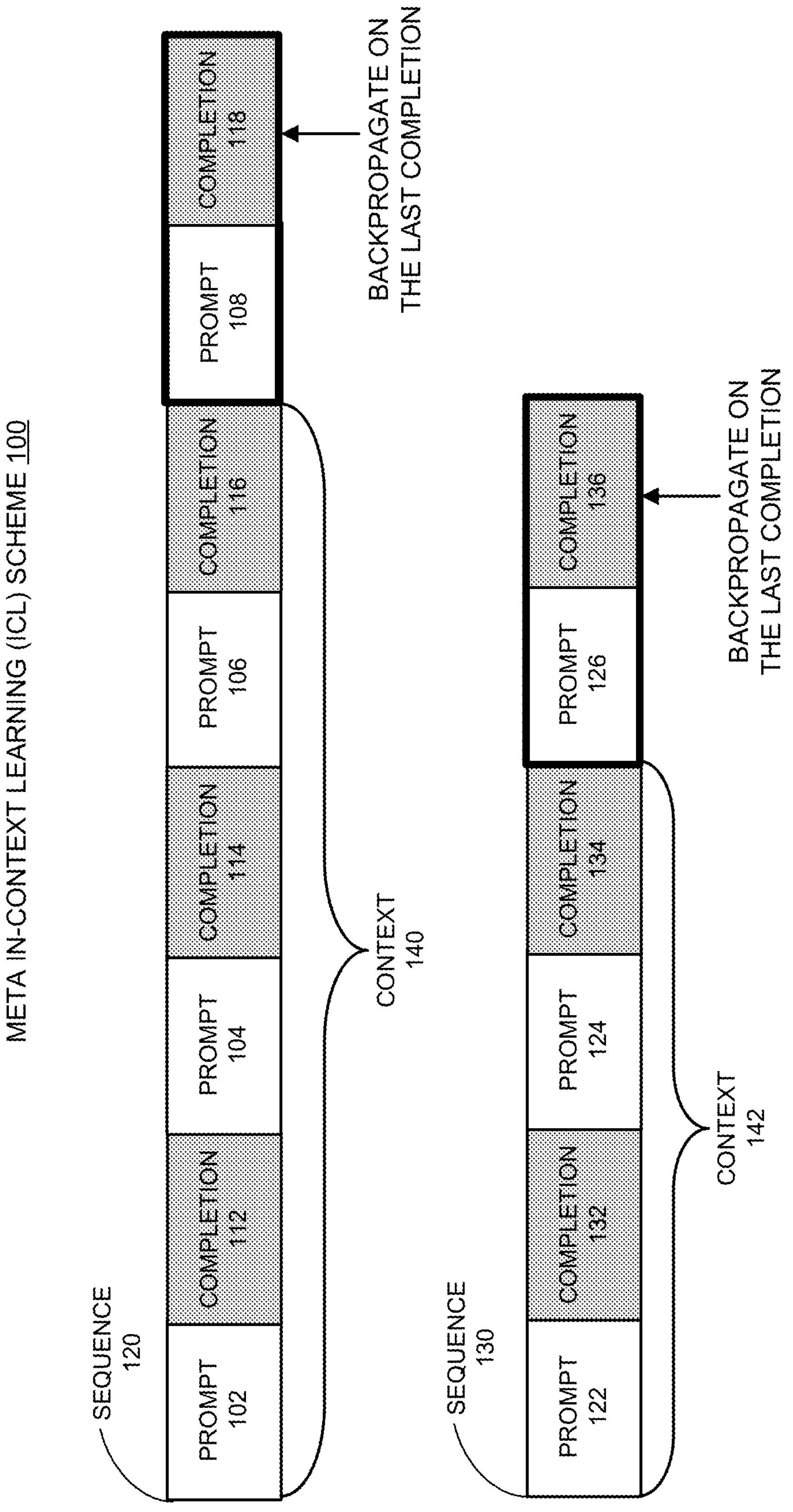
FIG. 1 (PRIOR ART)
FIG. 1 shows examples illustrating the operation principles of an existing meta-in-context learning (meta-ICL) scheme.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Terminology

Throughout this patent disclosure, the terms "prompt/completion example" and "question/answer example" are used interchangeably to mean a training example with a format that starts with a question/query and ends with an answer/response.

Overview

Disclosed includes an "all-shot" language model training system that employs a form of in-context learning to teach the language model to learn "how to learn in context" by providing the model with as many different numbers of examples as possible in the context of a given target task/behavior. In some embodiments, the disclosed all-shot language model training system (or simply "all-shot training system") provides as many examples as allowed by the size of a "context window" as the context for a training example provided to the model, wherein the in-context examples are configured such that the model backpropagates on the completion of training example, while being conditioned on the in-context examples. More specifically, the disclosed model training scheme causes the first example in an example sequence without any other example as context to be learned in a zero-shot fashion. Next, the second, i.e., subsequent example in the example sequence after the first example is learned in a 1-shot fashion when the subsequent example is learned in the context of the first example. Subsequently, the third example in the example sequence following the second example is learned in a 2-shot fashion, when the third example is learned in the context of the first and second examples preceding the third example. This sequential training and learning process continues until the last, i.e., Nth example in the example sequence is reached and backpropagated on. This means that the Nth example is learned in a (N-1)-shot fashion, because the Nth example is learned in the context of the preceding N-1 examples.

Compared with existing in-context learning approaches, such as the "meta in-context learning" approach by Facebook™ (also referred to as "meta-ICL scheme" hereinafter), the disclosed all-shot training system provides a number of advantages:

- The disclosed all-shot training system is significantly more efficient, because the training process is designed to learn, during a given training pass most or all of the examples provided to the model for the associated in-context learning. In contrast, the meta-ICL scheme only trains on a single example within a sequence of examples provided to a model for the associated in-context learning. Note that if k examples can be fitted within the maximum context limitation of a model (i.e., the size/capacity of the model "context window"), then the disclosed all-shot training system can be k times more efficient (e.g., k times faster in terms of training time) than that of the meta-ICL scheme;
- The disclosed all-shot training system can teach the language model to learn to perform equally well with a full range of different number of examples that can be used in the context (e.g., within a given context window). In other words, the trained language model will perform well regardless of the number of examples provided as the context. This ability allows the applicability and usage of the trained language model to be extremely flexible. In contrast, a trained model according to the meta-ICL scheme will perform well only for a small set of possible numbers of examples used as context, thereby significantly limiting the applicability and usage of the meta-ICL-based models;

The disclosed all-shot training system includes a data preprocessing mechanism to prepare input training data into a format that is the same as or sufficiently aligned with the target topic/task/behavior of the model. In this manner, the model can learn the training examples in the same or substantially the same context as the target topic/task/behavior of the model;

By taking advantage of the ever-growing context window size, the disclosed all-shot training system allows a large number of unique training examples be concatenated together as one training sequence having a size that still can be fit entirely within the context window, which is subsequently learned and trained on during a disclosed all-shot training pass.

All-Shot Learning System

When a language model is designed to respond to user prompts/queries, i.e., to answer/respond to user questions, e.g., a question like "what is the capital of France," the desired language model should respond to the final prompt, e.g., to answer the final question in a manner resembles what a human would answer the same question, instead of responding by generating another similar question or thought. As described in the background section, there are generally two approaches to accomplish the above language model construction goals: (1) the instruction tuning approach, i.e., the training approach that trains the model and updates the model parameters; and (2) the in-context learning approach that performs direct inferences (as such also referred to as the "direct inference approach") without training or fine-tuning the model. Note that during the in-context learning, a model is undergoing a process referred to as the "next token generation," wherein the model essentially constructs a probability distribution for the next word or phrase conditioned on the provided context. For example, when the model is asked "what is the price range of an economy car?" without the in-context learning, the model will answer the question in a more general manner. However, when the model is also provided with contextual information (e.g., contextual examples) before the question, e.g., "a Nissan car ranges from 20,000 to $120,000" and "Nissan is known to manufacture inexpensive cars," etc., then the model will become heavily biased toward Nissan cars when the same question is asked. In other words, the model will generate the next token (e.g., the answer) based on a conditional probability distribution conditioned on the contextual information provided in the model input.

Regarding using few-shot prompts (i.e., using multiple examples) for the in-context learning, it has been found that the more examples one can pack into the context input of the model, the better the learned model performance can be achieved, but with diminishing returns for each additional example. As a result, the existing in-context learning techniques often pack the context with a large number of examples, or just include a fixed number, e.g., 2-5 examples in the context. It has also been noticed that different models have different abilities to learn from the same set of in-context examples. Consequently, one of the objectives and hence one of the key features of the disclosed all-shot training system is to improve the model's ability to generate a higher quality conditional probability distribution for the next token, given a sequence of examples as the context inputs to the model. In other words, the disclosed all-shot training system is configured to improve both the model's ability "to learn in the context" and the ability to generate a higher quality conditional probability, given a sequence of relevant examples to be conditioned on.

One of the existing techniques that combine in-context learning and instruction tuning is referred to as "meta in-context learning" (also referred to as the "meta-ICL scheme" hereinafter), developed by Facebook Inc.™ Using the meta-ICL scheme, the language model is provided with training data formatted with the few-shot format in the above-described context. FIG. 1 shows examples illustrating the operation principles of a meta-ICL scheme 100. As can be seen in FIG. 1, during model training, meta-ICL scheme 100 constructs a training sequence 120 comprising a number of concatenated prompt/completion examples (also referred to as "prompt/completion pairs" hereinafter), including prompts 102-108 and corresponding completions 112-118. Next, for the instruction tuning component of the meta-ICL scheme 100, the model is trained on the training sequence 120 by backpropagating from the last completion 118. Furthermore, to implement the in-context learning part of the meta-ICL scheme 100, the prompt/completion examples 102/112, 104/114, and 106/116 prior to prompt/completion example 108/118 are used as the context for the training using prompt/completion 108/118 to be conditioned on. Note that in the model training pass based on training sequence 120, the model only learns one prompt/completion example, i.e., the prompt/completion pair 108/118.

Moreover, to implement meta-ICL scheme 100, the in-context examples 102/112, 104/114, and 106/116 are randomly selected among a bigger set of training examples of training dataset. This random-selection operation includes both: (1) randomly selecting a number (e.g., a number between 1 and 10) of how much context, i.e., how many examples to provide to the model as the context data; and (2) randomly sampling the randomly-selected number of examples from the training dataset, which are then combined and constructed into the training sequence (i.e., training sequence 120) as the context. For example, training sequence 120 is composed of three randomly-sampled prompt/completion pairs 102/112, 104/114, and 106/116 as the context for conditioning the training of the model based on prompt/completion pair 108/118, wherein the number "3" of in-context examples is a randomly-selected number.

Continuing with meta-ICL scheme 100, assuming there are more training examples in the training dataset, the above-described training pass using training sequence 120 is repeated on a completely different example (i.e., a new training example) selected from the training dataset. The new training pass begins by constructing a new training sequence in the same random manner, i.e., by (1) randomly selecting a new random number; (2) randomly sampling the new randomly-selected number of examples from the training dataset; and (3) concatenating the newly-sampled examples along with the new training example to form the new training sequence. For example, FIG. 1 shows constructs another training sequence 130 comprising a number of randomly-sampled prompt/completion examples, including prompts 122-126 and corresponding completions 132-136, wherein the number "2" is the new randomly-selected number. Next, the model is trained on the newly constructed sequence (e.g., training sequence 130) in a new training pass by backpropagating from the last completion 136 of the new training example (i.e., prompt/completion pair 126/136) in training sequence 130, and conditioning the training pass on the preceding prompt/completion pairs 122/132 and 124/134 as the context. Note that in this new model training pass, the model again is only trained on and therefore learns one prompt/completion example (i.e., prompt/completion pair 126/136), which is different from the previous training example (i.e., prompt/completion pair 108/118).

Note that depending on the total number of examples available within the given training dataset, the above-described training process based on each new training example will be repeated for each and every one of the examples in the training dataset. Moreover, for each training pass based on a new training example, the same two random selection steps are used to construct a corresponding training sequence, and the backpropagation takes place from the new training example within the new training sequence that is positioned at the end of the training sequence. Hence, if there are 50 training examples in the training dataset, the model will have to be trained 50 times over 50 training passes, and in each training pass, the model will backpropagate from a different training example positioned at the end of the given training pass.

Note that in the training pass based on training sequence 120, the backpropagation from the last completion 118 is conditional on a 3-shot context 140, whereas in the training pass based on training sequence 130, the backpropagation from the last completion 136 is conditional on a 2-shot context 142. Compared to a model that is trained by always using a constant number of shots as the context, the model trained through the meta-ICL scheme 100 can be more robust because different numbers of examples can be provided as context in different training passes. However, the number of shots in each of the training passes, i.e., the 3-shot in context 140 or the 2-shot in context 142, is randomly selected, and as a result does not guarantee all possible numbers of shots (e.g., from 1-10) can be implemented in different training passes, and is subject to over-fitting of certain numbers of shots.

As can be understood, there are a number of drawbacks associated with the meta-ICL scheme 100. First, when there are a large number of training examples in the training dataset, the meta-ICL scheme 100 has to retrain the model in the same number of times as the total number of examples in the training dataset, which is a computationally expensive and inefficient process. Second, because the context preceding the training example is formed by a random number of examples each time, some in-context examples in one training pass can be the same examples using for one or more other training passes, thereby reducing the diversity and hence the efficiency of the model training. Third, because the context preceding the training example is formed by a set of randomly-selected examples from the same training dataset, the selection of the in-context examples is subject to duplicated use of the same training examples, thereby further reducing the model training efficiency.

Note that during a model training process that involves combined in-context learning and instruction tuning through multiple training passes, choosing the proper number of in-context examples for each training pass is a hyperparameter that can have a large impact on the accuracy and perceived quality of the trained model. For example, while in general more examples in the context tend to yield better models, some models may decrease in quality when too many in-context examples are provided, i.e., being overfitted. Moreover, different models have different abilities to learn from the same set of in-context examples. The above-described meta-ICL scheme 100 always chooses the number of in-context examples randomly, i.e., to choose a random number in each training pass. In contrast, the disclosed all-shot training system is configured to perform a sequence of backward passes during each training pass, wherein the sequence of backward passes can be associated with a full range of different in-context examples. We now describe the all-shot training system in detail.

The disclosed all-shot training system provides a more efficient and robust language-model training process to teach the model to behave in an intended manner by improving the model's ability to learn in context. More specifically, the disclosed all-shot training system is designed to improve, by combining the in-context learning and the instruction tuning approach, the model's ability to generate a higher quality conditional probability distribution for the next token, given a set of in-context examples for the next token to be conditioned on. The disclosed all-shot training process includes preparing and providing in-context examples of high relevance to the target task of the model so that the intended model behavior can be seen by and therefore infused into the model. For example, when the target task is to answer user's questions, the model should behave exactly in the manner to answer a question in response to receiving the question, rather than to generate new questions. As a result, the training examples should be formatted as a set of question/answer examples in the context of the target question to be provided and learned by the model.

Figure 2:
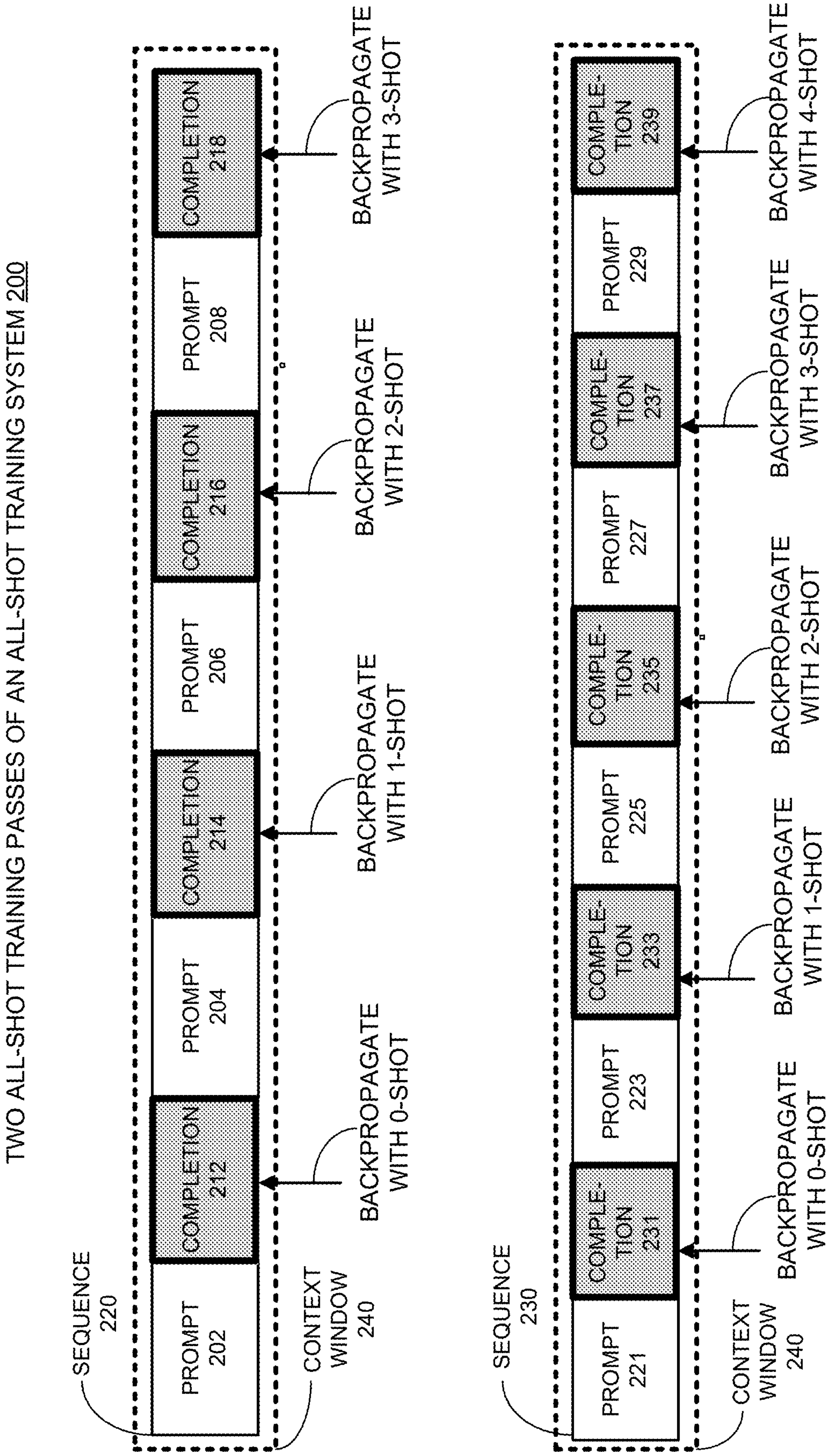
FIG. 2 illustrates the operation principles of the disclosed all-shot training system in the context of an exemplary training sequence in accordance with some embodiments described herein.

FIG. 2 illustrates the operation principles of the disclosed all-shot training system 200 in the context of an exemplary training sequence 220 in accordance with some embodiments described herein. Note that exemplary training sequence 220 in FIG. 2 may be identical to or similar to exemplary training sequence 120 in FIG. 1 for illustrating the operation principle of meta-ICL scheme 100, as both are composed of four prompt/completion examples. As can be seen in FIG. 2, training sequence 220 is constructed by concatenating four prompt/completion examples, including prompts 202-208 and corresponding completions 212-218, which is fitted into a context window 240. Note that the size of context window 240 should be no smaller than the concatenated size of training sequence 220. As a concrete example, the four prompt/completion examples, which are concatenated and fitted into a context window, are used to teach the model to answer questions of world capitals and have the following construction and content: [Prompt 202: What is the capital of Indonesia?/Completion 212: Jakarta]; [Prompt 204: What is the capital of Malaysia?/Completion 214: Kuala Lumpur]; [Prompt 206: What is the capital of France?/Completion 216: Paris]; [Prompt 208: What is the capital of Japan?/Completion 218: Tokyo]. Subsequently, all-shot training system 200 can train the model on each and every example within training sequence 220 through a first training pass (more detail on the multi-pass training process below).

Note that the number of prompt/completion examples in training sequence 220 (i.e., 4), which happens to be the same as training sequence 120 in FIG. 1, is only used as an example and for the convenience of comparison. In other embodiments, the number of prompt/completion examples in training sequence 220 can be greater than 4 or less than 4. In various embodiments, the number of examples included in an exemplary training sequence should allow the usage of the context window to be maximized. Moreover, although the 4 prompt/completion examples in training sequence 220 appear to have similar sizes, they do not have to have the same size. In other words, each of the 4 prompt/completion examples in training sequence 220 can have a different size from the other three prompt/completion examples in the same training sequence. For example, in the above-described world capital example of training sequence 220, all four prompt/completion examples have different sizes.

Moreover, all-shot training system 200 is designed such that training sequence 220 can maximize the usage of context window 240. Generally speaking, to utilize the full capacity of context window 240 of the model, the disclosed all-shot training system 200 is configured to construct training sequence 220 using a set of N (e.g., N=4) unique prompt/completion examples, wherein the concatenated N prompt/completion examples not only can be fully fitted inside context window 240, but also maximize the usage of context window 240 to be as close to the full size of context window 240 as possible. In contrast, meta-ICL scheme 100 will have to construct N (e.g., N=4) separate training sequences for the same set of N (e.g., N=4) unique prompt/completion examples, and perform N independent training passes. Because the total training time of the language model is proportional to the total number of such training sequences/passes, the disclosed all-shot training system 200 will generally take 1/N of the training time required by meta-ICL scheme 100 to train on the same set of N prompt/completion examples, thereby significantly more efficient than meta-ICL scheme 100 in terms of the required model training time. For example, if the size of the context window 240 allows for up to 4 prompt/completion examples to be fitted into the window 240 as shown in FIG. 2, all-shot training system 200 will take ¼ of the training time that would be required by meta-ICL scheme 100 to learn the same 4 prompt/completion examples. Apparently, the greater the number Nis allowed (which is primarily limited by the context window size), the more improvement can be achieved over meta-ICL scheme 100 in terms of model training efficiency (i.e., the more reduction in the model training time).

A person of ordinary skill can readily appreciate that when the training dataset includes a significant number or a large number of K examples that cannot be all fitted into one context window, i.e., K»N, all-shot training system 200 will construct multiple training sequences, and train the model through a sequence of training passes based on the multiple training sequences. More specifically, after the first set of N (e.g., N=4) unique examples from the training dataset has been used to construct a first training sequence (e.g., training sequence 220) to be used for training the model in the first training pass (to be described below), all-shot training system 200 will then select a second set of unique examples from the training dataset. In some embodiments, all-shot training system 200 selects the second set of P examples such that there is no duplicated example (i.e., no overlap) between the first set of N examples and the second set of P examples. Also assuming that each prompt/completion example in the training dataset has substantially the same size as other examples in the same training dataset, then it is reasonable to assume that the second set of P examples will have the same number of examples as in the first set of N examples, i.e., N=P, whereby the second set of examples can be concatenated and then fitted entirely within the same context window 240 and at the same time maximizing the usage of context window 240.

However, in reality different examples can have different sizes instead of all having a uniform length (e.g., referred to the above-described world capital example). This means that, to maximize the utility the full capacity of context window 240, which is a constant, the number of examples P in the second training sequence can be greater than or smaller than the number of examples N in the first training sequence, as long as the concatenated second set of examples can be fitted into and maximize the utilization of the size of context window 240. Note that the concatenated second set of examples forms the second training sequence. For example, FIG. 2 also shows a second training sequence 230 constructed by concatenating five prompt/completion examples (i.e., P=5), including prompts 221-229 and corresponding completions 231-239, which is fitted entirely inside the same context window 240.

Subsequently, all-shot learning system 200 can use the second training sequence 230 fitted into context window 240 to train the model in the second training pass (more detail on this training process below). By the same token of first training pass, the second training pass will require only 1/P of the training time required by meta-ICL scheme 100 to learn the same set of P prompt/completion examples. Note that if N=P, the overall training efficiency improvement over meta-ICL scheme 100 after two training passes remains the same as being Nx.

After constructing the second training sequence 230, all-shot training system 200 can continue to determine if the training dataset of K examples still has unselected examples not included in the first training sequence 220 and the second training sequence 230. If so, all-shot training system 200 can then select the third set of Q examples such that there is no duplicated example (i.e., no overlap) between the third set of examples and each of the first and second sets of examples, wherein the concatenated third set of Q examples can be fitted into the same context window 240 and at the same time maximizing the utilization of the context window size. Note that the concatenated third set of Q examples forms the third training sequence. Subsequently, all-shot learning system 200 can use the third training sequence fitted into context window 240 to train the model in the third training sequence in a third training pass (more detail on this training process below). Note that as long as there are more unused/unselected examples in the training dataset, all-shot training system 200 can repeat the same selection process to generate additional training sequences that are used to perform additional training passes until all of the examples in the training dataset have been exhausted.

In some embodiments, the all-shot training system 200 can first construct a set of training sequences from the training dataset in the above-described manner prior to performing any training pass on the model based on the constructed training sequences. In other words, all of the training sequences, such as training sequences 220 and 230 can be constructed before the actual trainings take place. As described above, the numbers of selected examples in different training sequences can be different from each other. As a result, the training time of the all-shot training system 200 based on the set of constructed training sequences is approximately proportional to the number of examples in the training dataset divided by an average number of examples associated with the set constructed training sequences. For example, if the set of constructed training sequences includes just three training sequences formed by the numbers of N, P, and Q selected examples, respectively, then the average number of examples associated with the set constructed training sequences would be (N+P+Q)/3, which is used in the calculation of training time of the all-shot training system 200.

Note that all of the above discussion has assumed that the entire training dataset cannot be all fitted into one context window size. However, in some embodiments, the context window size can also be large enough to accommodate an entire concatenated training dataset for a model. As such, all-shot training system 200 can maximize the usage of the context window by selecting the entire set of examples in the training dataset, concatenating the entire set of examples, and fitting the concatenated set of examples into the context window. In these embodiments, only one training sequence is constructed and one all-shot training pass is needed to train the model using the given training dataset.

We now describe embodiments of an all-shot training pass based on a given training sequence by all-shot learning system 200 in more detail. Generally speaking, each all-shot training pass involves training/backpropagating on each and every example in the training sequence while using other examples in the training sequence as context. For example, the all-shot training pass of the all-shot training system can define within the training sequence 220, a set of examples as the starting points of backward passes, referred to as “loss masks.” In some embodiments, all-shot learning system 200 defines the set of loss masks as each and every completion in the corresponding training sequence, e.g., the set of completions 212, 214, 216, and 218. In a transformer-based language model, all-shot learning system 200 can specify the set of loss masks in a single forward pass of the training pass, which is described in more detail below. During the backpropagation phase of the given training pass, the model is trained on the first prompt/completion example 202/212 in the input context window and learns that completion 212 is the correct answer to the corresponding prompt 202. Using the above capital example, all-shot training system 200 performs a backpropagation from the first capital question/answer to learn that the input “Jakarta” as the correct answer to the corresponding question “what is the capital of Indonesia?” Because the first prompt/completion example has no other preceding prompt/completion example to attend to, the first all-shot training pass performs a zero-shot learning when using the first prompt/completion example 202/212 to train the model.

After performing the zero-shot training/learning, the all-shot training pass based on training sequence 220 moves onto the second loss mask in the context window 240, i.e., the second completion example 214. At this point, the model has already learned that the first completion 212 is the correct answer to the first prompt 202. Through the second backpropagation step from completion example 214, the model next learns that input completion 214 is the correct answer to the corresponding input prompt 204. Using the above capital example, all-shot learning system 200 performs backpropagation from the second capital question/answer to learn that the input “Kuala Lumpur” as the correct answer to the corresponding input question “what is the capital of Malaysia?” However, the model training based on prompt/completion pair 204/214 can be conditioned on the first prompt/completion example 202/212 (which has already been learned) preceding the second prompt/completion pair 204/214, thereby essentially performing a one-shot learning at the same time. Using the same capital example, learning Kuala Lumpur as the capital of Malaysia is conditioned on the learned example of “what’s the capital of Indonesia?/Jakarta.”

After performing the one-shot training/learning, the all-shot training pass based on training sequence 220 moves onto the third loss mask in the context window, i.e., the third completion example 216. At this point, the model has already learned the first and second prompt/completion examples. Through the third backpropagation step from completion example 216, the model next learns that input completion 216 is the correct answer to the corresponding input prompt 206. Using the above capital example, all-shot training system 200 performs backpropagation from the third capital question/answer to learn that the input “Paris” as the correct answer to the corresponding input question “what is the capital of France?” However, the model training based on prompt/completion pair 206/216 can be conditioned on the first prompt/completion pair 202/212 and the second prompt/completion pair 204/214 (which have already been learned) preceding the third prompt/completion pair 206/216, thereby essentially performing a two-shot learning at the same time.

After performing the two-shot training/learning, the all-shot training pass based on training sequence 220 moves onto the fourth loss mask in the context window, i.e., the fourth completion example 218. At this point, the model has already learned that the first, second, and third prompt/completion examples. Through the fourth backpropagation step from completion example 218, the model next learns that input completion 218 is the correct answer to the corresponding input prompt 208. Using the above capital example, all-shot training system 200 performs backpropagation from the fourth capital question/answer to learn that the input “Tokyo” as the correct answer to the corresponding question “what is the capital of Japan?” However, the model training based on prompt/completion pair 208/218 can be conditioned on all three preceding examples 202/212, 204/214, and 206/216 (which have already been learned), thereby essentially performing a three-shot learning at the same time.

In this manner, the disclosed all-shot training pass based on a given training sequence, such as training sequence 220 continues to move further away from the front of the training sequence in the context window to find the next unprocessed loss mask and backpropagate from it to train on the next prompt/completion example. In so doing, the all-shot training system 200 continues to use the already learned prompt/completion examples preceding the next prompt/completion example as the context to condition the training on the next prompt/completion example. More specifically, if the next loss mask is the Nth completion example in the same training sequence, the model is trained to learn that the Nth completion example as the corrected answer to the Nth prompt example while the training is conditioned on the preceding (N-1) learned prompt/completion examples, in the manner of (N-1)-shot learning.

Note that the disclosed all-shot training pass of all-shot learning system 200 has a number of beneficial consequences. First, for each training sequence that is constructed by concatenating multiple prompt/completion examples to fully utilize the context window 230, each and every example in the training sequence will be backpropagated upon and learned, instead of only backpropagating on the last example as in meta-ICL scheme 100. This means that each all-shot training pass will incur a full range of different few-shot learning: from the zero-shot learning to (N-1)-shot learning, wherein Nis the number of examples in the training sequence. Another unique feature of the above-described all-shot training pass is that the entire set of examples in the context window is used as training data to train the model in N sub-steps, instead of only training on the last example as in the meta-ICL scheme 100.

Figure 3A:
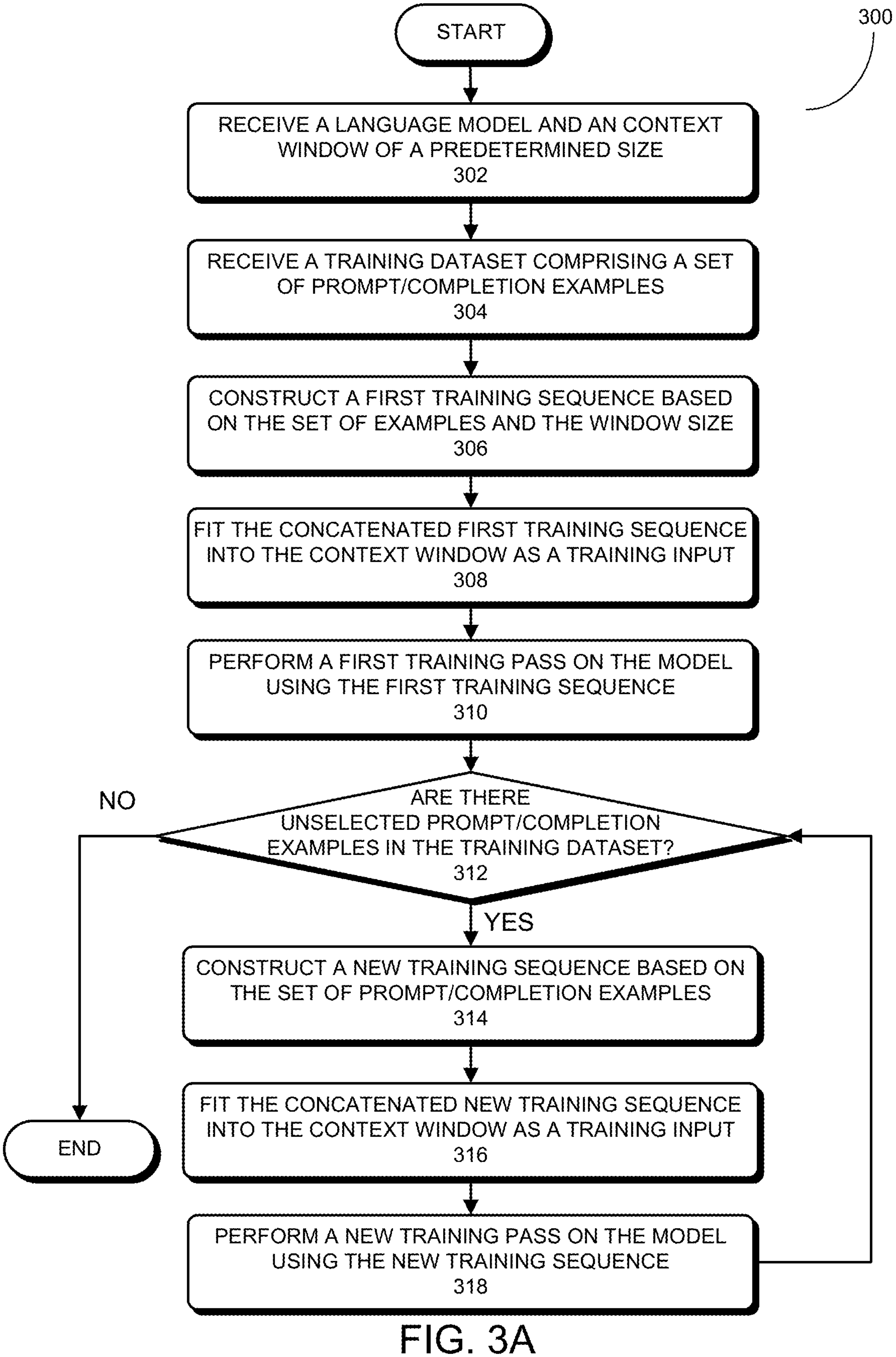
FIG. 3A presents a flowchart illustrating an exemplary process for training a language model based on a given training dataset in accordance with some embodiments described herein.

FIG. 3A presents a flowchart illustrating an exemplary process 300 for training a language model based on a given training dataset comprising K examples in accordance with some embodiments described herein. In one or more embodiments, one or more of the steps in FIG. 3A may be omitted, repeated, and/or performed in a different order. Accordingly, the specific arrangement of steps shown in FIG. 3A should not be construed as limiting the scope of the technique.

In some embodiments, process 300 begins by receiving a language model and an accompanying context window of a predetermined size (step 302). Process 300 additionally receives a training dataset comprising a set of prompt/completion examples (step 304). In some embodiments, the set of prompt/completion examples are designed in the same context as a target task for the model, e.g., to answer user's questions of a target topic, such as the capital cities. In some embodiments, for the all-shot training to be successful, the set of prompt/completion examples in the training data needs to be formatted in the same style as the target task. For example, when the target task is to provide an answer for an input question of a target topic, such as answering capitals of the countries, each example in the set of prompt/completion examples should be formatted in the same question/answer format and related to the same target topic.

Next, process 300 constructs a first training sequence based on the set of prompt/completion examples and the size of the context window (step 306). In some embodiments, process 300 constructs the first training sequence by selecting from the training dataset a first subset of the set of prompt/completion examples, such that the combined size of the selected prompt/completion examples is equal to or substantially equal to the predetermined size of the context window. In other words, the first subset of the prompt/completion examples is selected such that the combined size of the selected prompt/completion example is made as close to the predetermined size of the context window as possible. Note that constructing the training sequence in such manners both maximizes the usage of the context window, and at the same time allows for including as many different prompt/completion examples in the first training sequence as possible. Next, process 300 concatenates the selected first subset of prompt/completion examples to form the first training sequence.

Process 300 next fits the concatenated first training sequence into the context window as a training input to the language model (step 308). Subsequently, process 300 performs a first training pass on the model using the first training sequence to infuse a target behavior into the language model (step 310). Process 300 next determines if there are unselected prompt/completion examples in the training dataset by the first training pass (step 312). If not, it is indicative that the entire training dataset has been selected, and process 300 terminates. However, in response to determining that there are unselected prompt/completion examples, process 300 constructs another/new training sequence based on the set of prompt/completion examples and the size of the context window (step 314). In some embodiments, process 300 constructs the new training sequence by selecting from the training dataset a different/new subset of the prompt/completion examples, wherein the new subset of prompt/completion examples does not include any selected prompt/completion examples in the first training sequence. Moreover, the combined size of the selected new subset of prompt/completion examples is made as close to the predetermined size as possible to maximize the usage of the context window and to include as many different and unused prompt/completion examples as possible. The selected new subset of prompt/completion examples is concatenated to form the second training sequence. Process 300 then fits the new training sequence into the context window as another/new training input to the language model (step 316). Subsequently, process 300 performs a new training pass for the model using the new training sequence to further infuse the target behavior into the language model (step 318). Process 300 next returns to step 312 to determine if there are still unselected prompt/completion examples in the training dataset after the second training pass. If so, process 300 continues by repeating steps 314-318. Otherwise, it is indicative that the entire training dataset has been used to train the model, and process 300 terminates.

Figure 3B:
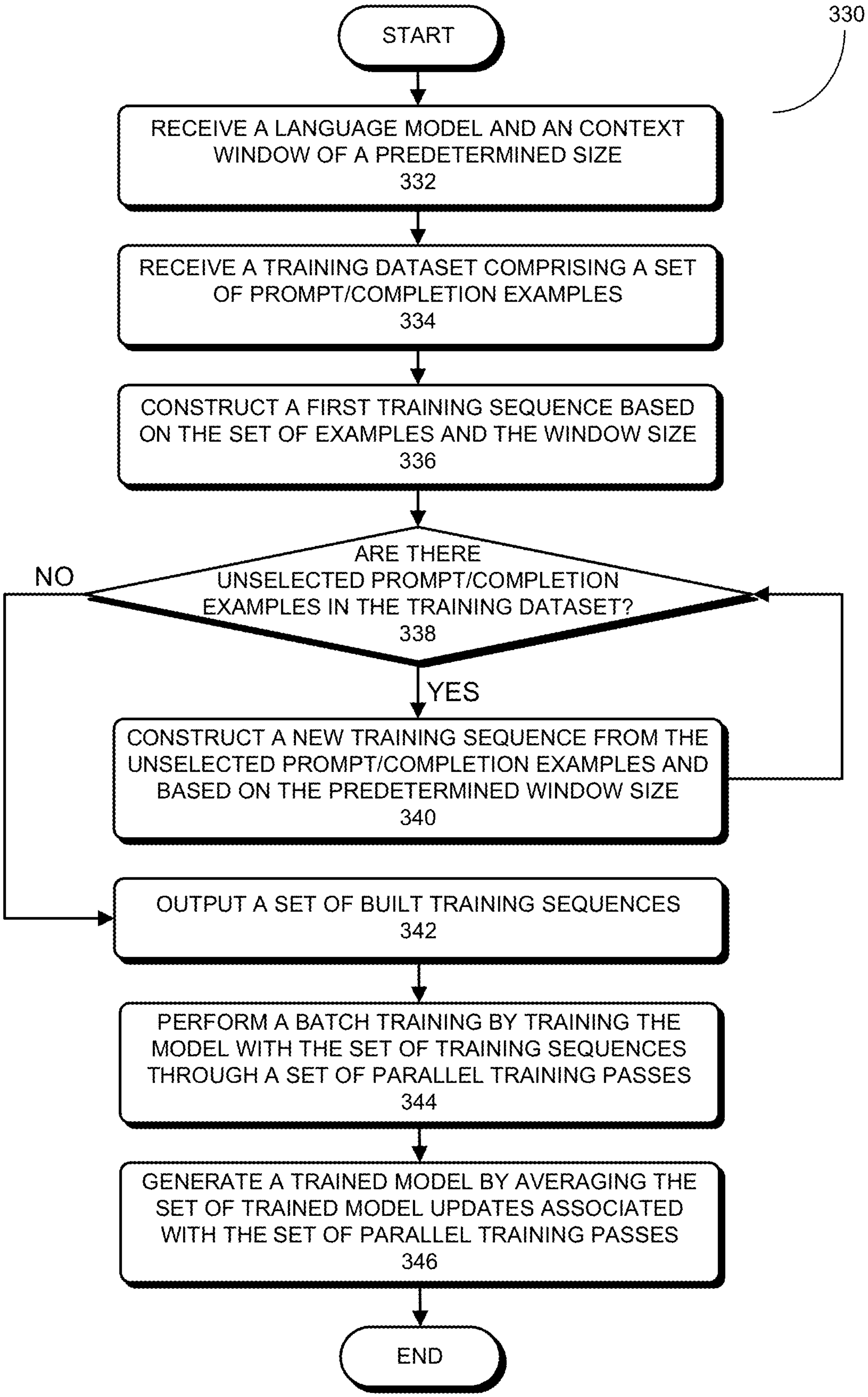
FIG. 3B presents a flowchart illustrating another exemplary process for training a language model based on a given training dataset in accordance with some embodiments described herein.

FIG. 3B presents a flowchart illustrating another exemplary process 330 for training a language model based on a given training dataset in accordance with some embodiments described herein. In one or more embodiments, one or more of the steps in FIG. 3B may be omitted, repeated, and/or performed in a different order. Accordingly, the specific arrangement of steps shown in FIG. 3B should not be construed as limiting the scope of the technique.

In some embodiments, process 330 begins by receiving a language model and an accompanying context window of a predetermined size (step 332). Process 330 additionally receives a training dataset comprising a set of prompt/completion examples (step 334). In some embodiments, the set of prompt/completion examples are designed in the same context as a target task for the model, e.g., to answer user's questions of a target topic, such as the capital cities. In some embodiments, for the all-shot training to be successful, the set of prompt/completion examples in the training data needs to be formatted in the same style as the target task. For example, when the target task is to provide an answer for an input question of a target topic, such as answering capitals of the countries, each example in the set of prompt/completion examples should be formatted in the same question/answer format and related to the same target topic.

Next, process 330 constructs a first training sequence based on the set of prompt/completion examples and the predetermined size of the context window (step 336). In some embodiments, process 330 constructs the first training sequence by selecting from the training dataset a first subset of the set of prompt/completion examples, such that the combined size of the selected prompt/completion examples is equal to or substantially equal to the predetermined size of the context window. In other words, the first subset of the prompt/completion examples is selected such that the combined size of the selected prompt/completion example is made as close to the predetermined size of the context window as possible without exceeding the predetermined size. Note that constructing a training sequence in such a manner both maximizes the usage of the context window, and at the same time allows for including as many different prompt/completion examples in the first training sequence as possible. Next, process 330 concatenates the selected first subset of prompt/completion examples to form the first training sequence.

Process 330 next determines if there are unselected prompt/completion examples in the training dataset by the constructed training sequence(s) (step 338). If not, it is indicative that the entire training dataset has been selected, and process 330 proceeds to output a set of constructed training sequences (step 342). However, in response to determining that there are unselected prompt/completion examples, process 330 constructs the next, i.e., a new training sequence from the unselected prompt/completion examples in the training dataset and the predetermined size of the context window (step 340). In some embodiments, process 330 constructs the new training sequence by selecting from the training dataset a different/new subset of the prompt/completion examples, wherein the new subset of prompt/completion examples does not include any selected prompt/completion example by the already-constructed training sequences. Moreover, the combined size of the selected new subset of prompt/completion examples is made as close to the predetermined size as possible to maximize the usage of the context window without exceeding the predetermined size. The selected new subset of prompt/ completion examples is then concatenated to form the next training sequence. After constructing the new training sequence, process 330 returns to step 338 to either construct another training sequence or exit the training sequence construction phase.

Process 330 subsequently performs a batch training by training the model simultaneously with the set of constructed training sequences through a set of parallel training passes (step 344). Note that each training pass in the set of parallel training passes based on a given training sequence generates a corresponding trained model update. Next, process 330 generates a fully trained model by averaging the set of trained model updates associated with the set of parallel training passes (step 346).

Figure 4:
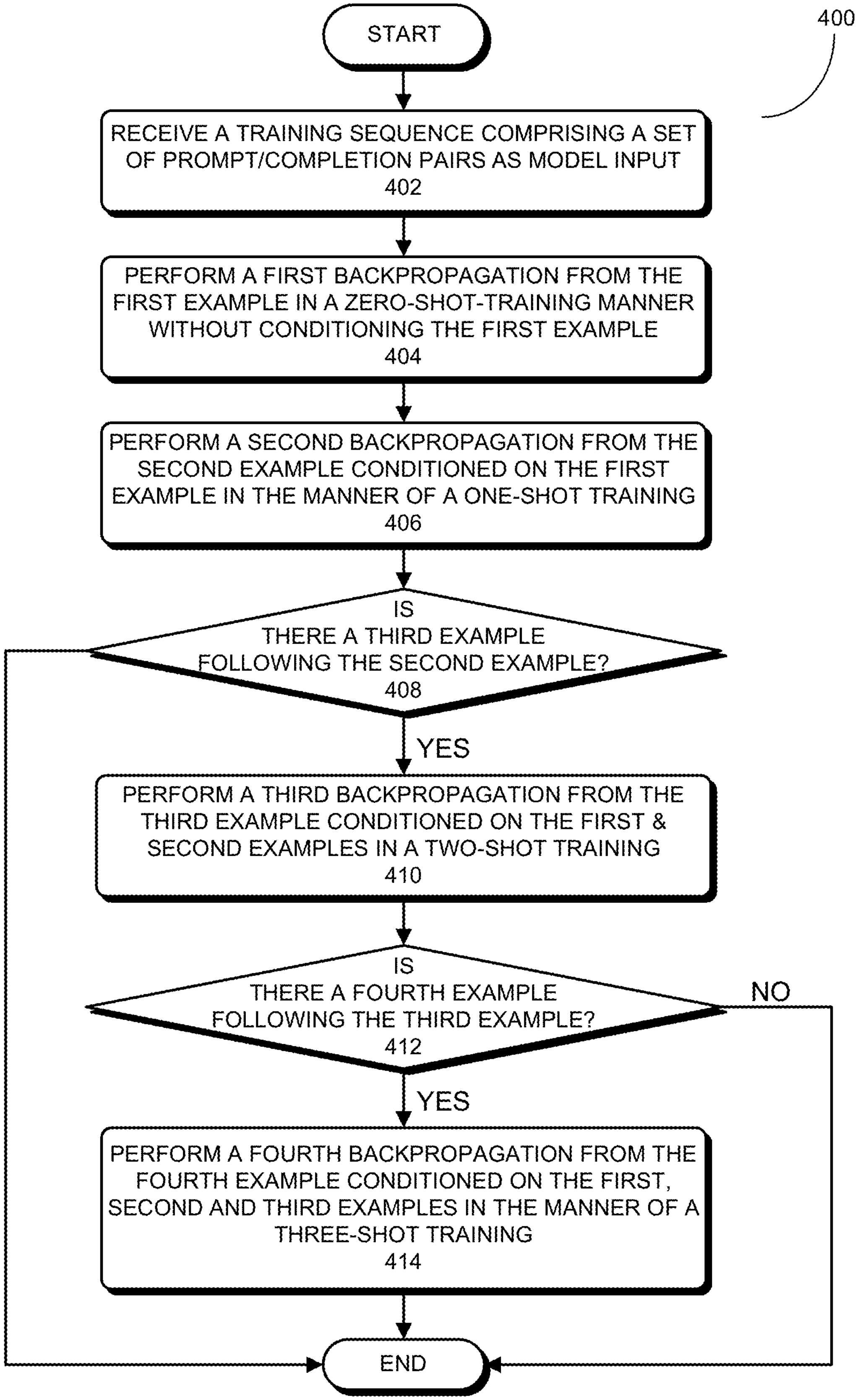
FIG. 4 presents a flowchart illustrating an exemplary process for performing a single all-shot training pass based on a constructed training sequence in accordance with some embodiments described herein.

FIG. 4 presents a flowchart illustrating an exemplary process 400 for performing a single all-shot training pass based on a constructed training sequence in accordance with some embodiments described herein. In one or more embodiments, one or more of the steps in FIG. 4 may be omitted, repeated, and/or performed in a different order. Accordingly, the specific arrangement of steps shown in FIG. 4 should not be construed as limiting the scope of the technique.

Process 400 may begin by receiving a training sequence as the model input through the context window, wherein the training sequence is composed of a set of concatenated prompt/completion examples (step 402). Note that the training sequence herein can be any of the constructed training sequences, such as the first training sequence or the second training sequence described above in conjunction with FIG. 3A. Next, process 400 performs a first backpropagation from the first completion in the first prompt/completion example in the training sequence to learn that the first completion is the desired answer to the corresponding first prompt. Because the first prompt/completion example has no preceding prompt/completion example in the training sequence, the first backpropagation is effectively a zero-shot training that trains the model using the first prompt/completion example without conditioning the first prompt/completion example (step 404). Next, process 400 performs a second backpropagation from the second completion in the second prompt/completion example immediately following the first prompt/completion example in the training sequence to learn that the second completion is the desire answer to the corresponding second prompt. Moreover, the second backpropagation is conditioned on the first prompt/completion example preceding the second prompt/completion example, thereby effectively performing a one-shot training based on the first and second prompt/completion examples (step 406).

After performing the one-shot training, process 400 then determines if there is at least a third prompt/completion example immediately following the second prompt/completion example in the training sequence (step 408). If not, the all-shot training pass terminates. Otherwise, process 400 performs a third backpropagating from the completion of the third prompt/completion example while using the first and second preceding prompt/completion examples as the associated context, thereby effectively performing a two-shot training based on the first, second and third prompt/completion examples (step 410).

After performing the two-shot training, process 400 further determines if there is at least a fourth prompt/completion example immediately following the third prompt/completion example in the training sequence (step 412). If not, the all-shot training pass terminates. Otherwise, process 400 performs a fourth backpropagating from the completion of the fourth prompt/completion example while using the first, the second, and the third preceding prompt/completion examples as the associated context, thereby effectively performing a three-shot training based on the first, second, third and fourth prompt/completion examples (step 414).

Assuming that the training sequence is composed of a total of four prompt/completion examples, then process 400 may terminate after step 414. Generally speaking, assuming the training sequence is composed of a sequence of N concatenated prompt/completion examples, the all-shot training pass of process 400 includes: (1) performing a zero-shot training based on the first prompt/completion example; and (2) sequentially performing N-1 few-shot trainings, wherein each few-shot training in the sequence of N-1 few-shot trainings is a (M-1)-shot training which performs backpropagation from the Mth prompt/completion example in the training sequence while conditioning the backpropagation with the preceding M-1 prompt/completion examples, wherein M=2, . . . , N.

Generally speaking, the training time for a transformer-based language model using the attention mechanism primarily depends on the number of times the model is called, but to a much lesser degree on what the model sees as inputs within a given training sequence. In other words, the training time of the transformer-based model is generally proportional to the total number of constructed training sequences out of a training dataset and therefore the total number of training passes to train the model. With this observation in mind, all-shot training system 200 can minimize the overall training time by minimizing the number of constructed training sequences by way of maximizing the usage of the context window size of the language model.

In some embodiments, a disclosed single all-shot training pass based on a given training sequence fitted begins with calling a transformer-based language model and performing a single forward pass based on the set of examples within the given training sequence. It is important to note that a transformer architecture using the attention mechanism is capable of backpropagating on every example that is provided to the model through a single forward pass. This property of the transformer architecture implies that through the single forward pass, the transformer architecture provides the user with the flexibility to specify which examples within the context window to backpropagate on and also which examples within the context window not to backpropagate on, wherein each example specified for backpropagation can be referred to as a "loss mask." Moreover, the attention mechanism within the transformer architecture also provides the user with the flexibility to specify, for a given loss mask, which other examples in the context window the given loss mask to be conditioned on during the backpropagation, referred to as the "attention mask" for the given loss mask.

In other words, the attention mechanism allows the user to specify and control, within a given context window/training sequence, both (1) the loss masks, i.e., which of the examples within the context window/training sequence to backpropagate on; and (2) the attention masks, i.e., on what conditions to backpropagate from each specified loss mask. More specifically, the attention mask specifies, for a given loss mask, which other prompt/completion examples within the training sequence to attend to, and which other prompt/completion examples within the training sequence to be ignored/not attended to. Hence, during the backpropagation from a given loss mask/example, the model will have the given loss mask/example conditioned on prompt/completion examples specified in the corresponding attention mask.

Note that the above flexibilities associated with a single all-shot training pass can then be specified through a single forward pass by calling the language model once. In some embodiments, the attention mask for a given loss mask, i.e., a specified example for backpropagation, is only selected from those examples before/preceding the loss mask in the context window, wherein the attention mask can be specified as either a subset of those preceding examples, or each and every example preceding the given loss mask. However, in other embodiments, the attention mask for a given loss mask can be selected from those examples both before/preceding the loss mask and after/succeeding the loss mask in the context window, i.e., any example in the context window other than the given loss mask. In these embodiments, the attention mask can be specified as either a subset of these preceding and succeeding examples, or each and every of the preceding and succeeding examples.

Consequently, for each constructed training sequence, the all-shot training system is configured to control the model training process through at least two control arguments, i.e., the loss masks and the attention masks. In some embodiments, the all-shot training system can specify the loss masks as being each and every prompt/completion example within the training sequence, thereby causing model training based on the given training sequence to learn/backpropagate on every and every prompt/completion example. However, the all-shot training system can also specify the loss masks as a subset of the prompt/completion examples within the training sequence, so that the model training based on the given training sequence will learn/backpropagate on the specified subset of prompt/completion examples.

In some embodiments, during the backpropagation step of the model training, the all-shot training pass is configured to backpropagate on each and every prompt/completion example in the training sequence through a sequence of backward passes. In other words, the loss masks are simply formed by each and every prompt/completion example in the training sequence. Moreover, the attention mask for each loss mask in the all-shot training pass is simply each and every example preceding the given loss mask in the training sequence. Specifically, the all-shot training pass first backpropagates from the very first completion example and uses the associated prompt example as the context, thereby performing a zero-shot training. Next, the all-shot training pass backpropagates from the second completion example, while conditioning the second prompt/completion example on the first prompt/completion example which has already been learned, thereby performing a one-shot training. If there are additional examples in the training sequence/context window, the all-shot training pass proceeds to backpropagate/learn on the third completion example, while conditioning the third prompt/completion example on the first and second prompt/completion examples which have already been learned, thereby performing a two-shot training. In this manner, the all-shot training pass continues until the last prompt/completion example is reached and learned while conditioned on all of the preceding learned prompt/completion examples, thereby performing a (N-1)-shot learning (wherein N is the number of concatenated prompt/completion examples in the current context window/training sequence).

In various embodiments, N in the (N-1)-shot learning is a number between 2-50, wherein a larger N tends to be used for easier tasks/applications such as query/answer tasks, wherein each training example does not contain many words. In contrast, a smaller N tends to be used for more complex tasks/applications such as summarization, wherein each training example may require a lot of words, such as an entire paragraph of text or even an entire article. In the summarization example, it is typical to have N to be between 2-5, so that an all-shot training pass can include from 1-shot up to 5-shot. However, the number of examples to be included and therefore the number of shots to be performed by an all-shot training pass is primarily constrained by the size of the context window.

Note that the last backward pass in the disclosed all-shot training pass is identical to the backpropagation step of meta-ICL scheme 100 if the same training sequence is used. As can be seen, with the same training sequence the all-shot training pass allows for learning/training on every prompt/completion example in the training sequence in a growing manner by proving increasingly more context in the next backpropagation step, whereas the meta-ICL scheme 100 can only learn/train on the last prompt/completion example in the training sequence. As a result, the all-shot training system 200 is significantly more efficient than the meta-ICL scheme 100 in training the model based on a given training sequence. Moreover, by performing the all-shot training pass in the above-described sequential and growing manner based on the given training sequence, the all-shot training pass does not incur any additional training time, or require any additional computational resource.

Referring back to the capital example, during the single forward pass to train the model using the sequence of examples, both loss masks and the associated attention mask for each of the loss masks are specified. Next, when backpropagating on the first answer example, i.e., Jakarta, we have the opportunity to only attend to or in other words to condition the first answer example on the associated prompt "what is the capital of Indonesia?" Next, when learning the second answer example Kuala Lumpur, the attention mechanism applied during the forward pass allows for the flexibility of either choosing or not choosing the first question/answer example (i.e., what is the capital of Indonesia?/Jakarta) for the second example to be conditioned on during the backpropagation. Next, when learning the third question example Paris, the attention mechanism applied during the forward pass has the flexibility of specifying which of the first question/answer example and the second question/answer example that precede the third question example for the third answer example to be conditioned on during the backpropagation. For example, the third question example can be conditioned on: (1) only the first question/answer example; or (2) only the second question/answer example; or (3) both the first question/answer example and the second question/answer example. Again, all of these flexibilities of choosing what examples to backpropagate on and on what conditions are provided by the attention mechanism, and controlled/specified during the single forward pass when the model is called.

As mentioned above, the total training time of the language model primarily depends on how many times the language model is called, i.e., the number of forward passes, rather than the number of backward passes which is determined by the number of loss masks specified for each training sequence/pass. Because the number of forward passes is simply proportional to the number of training sequences/training passes, the total training time of the disclosed all-shot training system 200 can be significantly reduced compared to the meta-ICL scheme 100 by maximizing the usage of the context window to reduce the total number of training sequences/training passes required.

Note that a meaningful comparison between the all-shot training system 200 and meta-ICL scheme 100 can be made when a model is trained based on the same dataset. Let's assume that we have a training dataset of 50 examples, e.g., 50 questions/answers for the 50 US states. In this example, the meta-ICL scheme 100 will build 50 separate training sequences, one for each of the 50 examples. As a result, the training time associated with the meta-ICL scheme 100 for a transformer-based model is proportional to the number of training sequences, i.e., 50, which equals the number of times the model is called. In contrast, the disclosed all-shot training system 200 attempts to fit as many different examples as possible into a given training sequence/context window, limited only by the size of the context window. For example, if 5 different examples can be fitted into the context window on average, then the disclosed all-shot training system 200 will construct about 10 separate training sequences from the given training dataset. As a result, only 10 forward passes is needed, which is only ⅕ of the forward passes needed by the meta-ICL scheme 100 to process the same training dataset. This means that the training time of the all-shot training system 200 will be approximately 5× faster than the training time required for meta-ICL scheme 100.

Alternatively, if 4 different examples can be fitted into the context window of the model on average, then the disclosed all-shot training system 200 will construct about 12 or 13 separate training sequences from the same training dataset. As a result, only 12 or 13 forward passes is needed, which is about ¼ of the forward passes required by the meta-ICL scheme 100 to process the same training dataset. This means that the training time of the all-shot training system 200 will be approximately 4× faster than the training time required for the meta-ICL scheme 100. As can be seen, while the training time of the meta-ICL scheme 100 is proportional to the number of examples in the training dataset, the training time of the all-shot training system 200 is approximately proportional to the number of examples divided by the average number of examples that can be fitted within each training sequence/context window.

Figure 5:
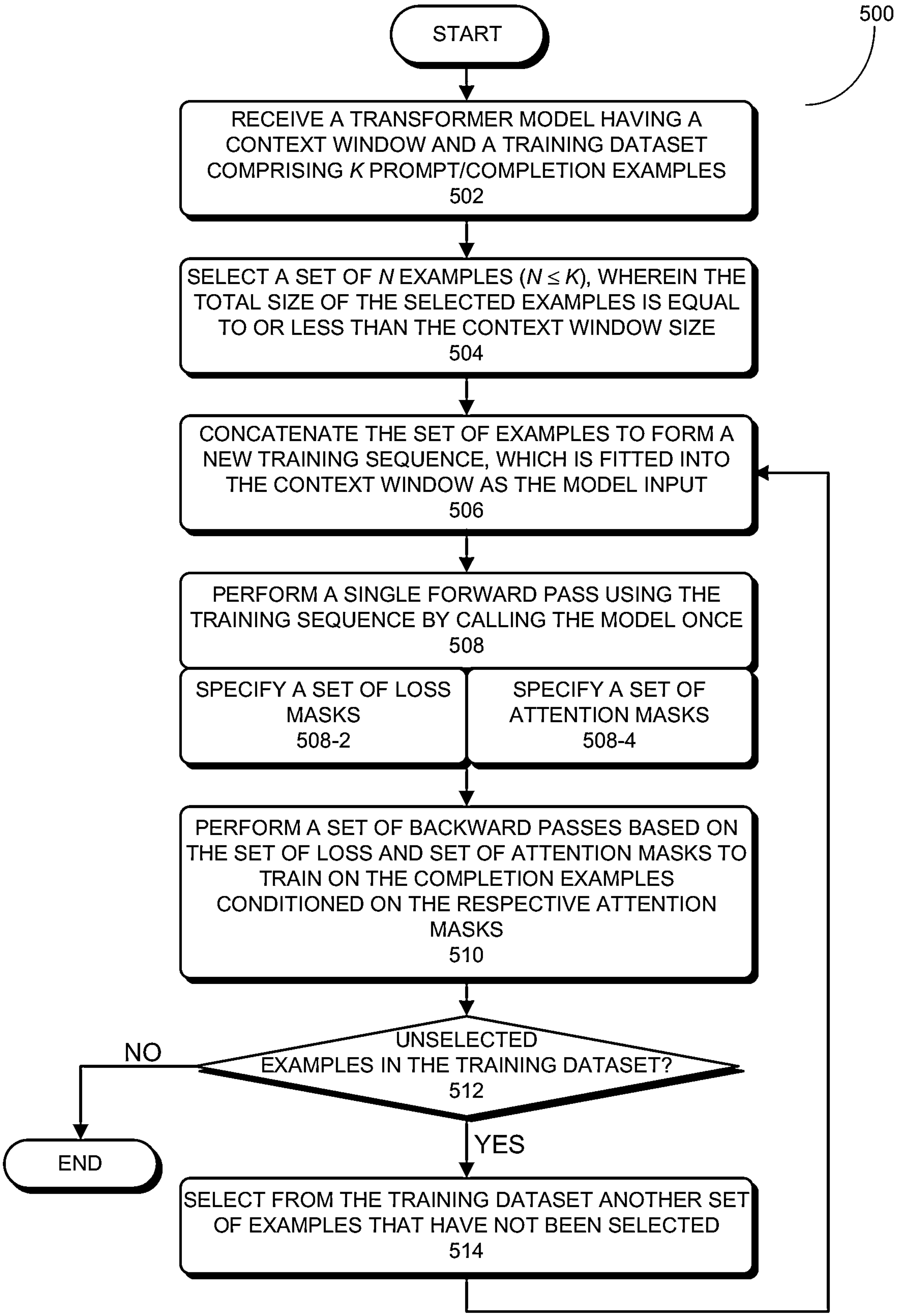
FIG. 5 presents a flowchart illustrating an exemplary process for performing all-shot training on a transformer-based language model based on a training dataset in accordance with some embodiments described herein.

FIG. 5 presents a flowchart illustrating an exemplary process 500 for performing all-shot training on a transformer-based language model based on a training dataset in accordance with some embodiments described herein. In one or more embodiments, one or more of the steps in FIG. 5 may be omitted, repeated, and/or performed in a different order. Accordingly, the specific arrangement of steps shown in FIG. 5 should not be construed as limiting the scope of the technique.

Process 500 may begin by receiving a transformer model having a context window and a training dataset comprising a set of K prompt/completion examples (step 502). Next, process 500 selects from the training dataset a set of N prompt/completion examples (N≤K), wherein the combined size of the selected N prompt/completion examples is equal to or less than the context window size (step 504). Process 500 then concatenates the set of selected prompt/completion examples to form a new training sequence, which is fitted into the context window as the model input (step 506). Next, process 500 performs a single forward pass using the training sequence by calling the transformer model once (step 508). While performing the single forward pass, process 500 additionally: (1) specifies a set of loss masks, wherein each loss mask is a selected completion example within the training sequence to backpropagate on (step 508-2); and (2) specifies a set of attention masks for the set of loss masks, wherein each attention mask specifies, during backpropagating from a given loss mask, what other prompt/completion examples within the training sequence to be attended to/used as the context (step 508-4).

As described above, process 500 can specify each and every completion example in the training sequence as a loss mask for backpropagation. In other embodiments, process 500 only specifies a subset of the completion examples in the training sequence as the loss masks for backpropagation. Moreover, process 500 can specify an attention mask for a given loss mask to include each and every example before/preceding the given loss mask in the training sequence. In other embodiments, process 500 can specify the attention mask for a given loss mask to include both examples before/preceding the given loss mask in the training sequence and examples after/succeeding the given loss mask in the training sequence.

Next, process 500 performs a set of backward passes based on the set of loss masks and the set of attention masks to train on the selected set of completion examples conditioned on the respective attention masks (step 510). Note that the steps 508 and 510 form the first all-shot training pass based on the first training sequence. Process 500 next determines if there are unselected prompt/completion examples in the training dataset after the first training pass (step 512). If not, it is indicative that the entire training dataset has been used to train the language model, and process 500 terminates. Otherwise, process 500 selects from the training dataset another set of prompt/completion examples that have not been selected for training before (step 514). Next, process 500 returns to step 506 and repeats steps 506-510 to perform a new all-shot training pass based on the new training sequence.

Figure 6:
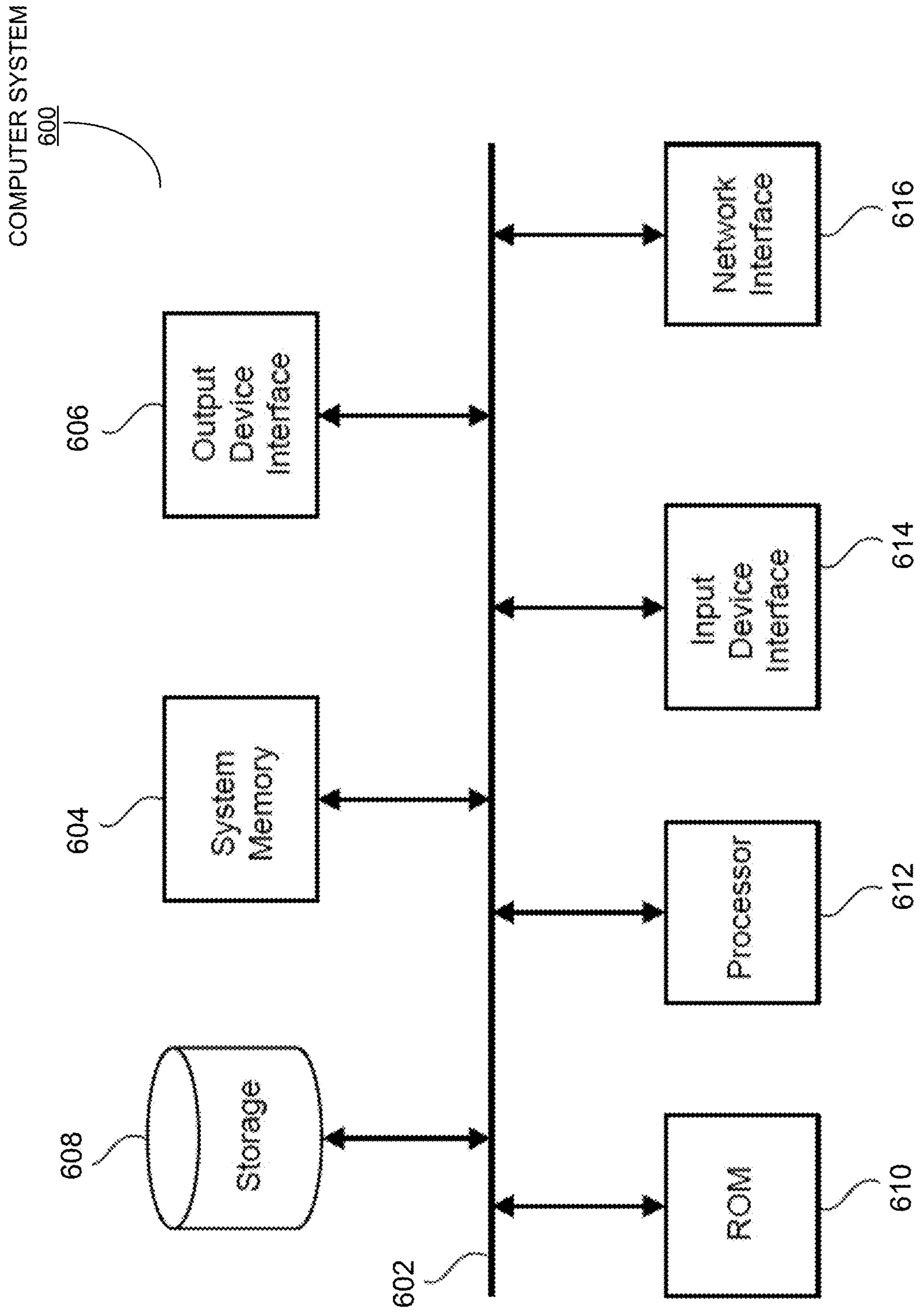
FIG. 6 conceptually illustrates a computer system with which some embodiments of the subject technology can be implemented.

FIG. 6 conceptually illustrates a computer system with which some embodiments of the subject technology can be implemented. Computer system 600 can be a client, a server, a computer, a smartphone, a PDA, a laptop, or a tablet computer with one or more processors embedded therein or coupled thereto, or any other sort of computing device. Such a computer system includes various types of computer-readable media and interfaces for various other types of computer-readable media. Computer system 600 includes a bus 602, processing unit(s) 612, a system memory 604, a read-only memory (ROM) 610, a permanent storage device 608, an input device interface 614, an output device interface 606, and a network interface 616.

Bus 602 collectively represents all system, peripheral, and chipset buses that communicatively connect the numerous internal devices of computer system 600. For instance, bus 602 communicatively connects processing unit(s) 612 with ROM 610, system memory 604, and permanent storage device 608.

From these various memory units, processing unit(s) 612 retrieves instructions to execute and data to process in order to execute various processes described in this patent disclosure, including the all-shot training processes described in conjunction with FIGS. 3A-5. The processing unit(s) 612 can include any type of processor, including but not limited to, a microprocessor, a graphic processing unit (GPU), a tensor processing unit (TPU), an intelligent processor unit (IPU), a digital signal processor (DSP), a field-programmable gate array (FPGA), and an application-specific integrated circuit (ASIC). Processing unit(s) 612 can be a single processor or a multi-core processor in different implementations.

ROM 610 stores static data and instructions that are needed by processing unit(s) 612 and other modules of the computer system. Permanent storage device 608, on the other hand, is a read-and-write memory device. This device is a non-volatile memory unit that stores instructions and data even when computer system 600 is off. Some implementations of the subject disclosure use a mass-storage device (such as a magnetic or optical disk and its corresponding disk drive) as permanent storage device 608.

Other implementations use a removable storage device (such as a floppy disk, flash drive, and its corresponding disk drive) as permanent storage device 608. Like permanent storage device 608, system memory 604 is a read-and-write memory device. However, unlike storage device 608, system memory 604 is a volatile read-and-write memory, such as a random access memory. System memory 604 stores some of the instructions and data that the processor needs at runtime. In some implementations, various processes described in this patent disclosure, including the all-shot training processes described in conjunction with FIGS. 3A-5, are stored in system memory 604, permanent storage device 608, and/or ROM 610. From these various memory units, processing unit(s) 612 retrieves instructions to execute and data to process in order to execute the processes of some implementations.

Bus 602 also connects to input and output device interfaces 614 and 606. Input device interface 614 enables the user to communicate information to and select commands for the computer system. Input devices used with input device interface 614 include, for example, alphanumeric keyboards and pointing devices (also called "cursor control devices"). Output device interface 606 enables, for example, the display of images generated by computer system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 602 also couples computer system 600 to a network (not shown) through a network interface 616. In this manner, the computer can be a part of a network of computers (such as a local area network ("LAN"), a wide area network ("WAN"), an intranet, or a network of networks, such as the Internet. Any or all components of computer system 600 can be used in conjunction with the subject disclosure.

The various illustrative logical blocks, modules, circuits, and algorithm steps described in connection with the embodiments disclosed in this patent disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, flash memory, CD-ROM or other optical disk storage, magnetic disk storage or other magnetic storage devices, or any other medium that may be used to store desired program code in the form of instructions or data structures and that may be accessed by a computer. The terms "disk" and "disc," as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer-program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method of performing in-context few-shot training for a transformer-based language model, comprising: receiving the transformer-based language model having a context window of a predetermined size; receiving a training dataset comprising a set of K prompt/completion examples; constructing a first training sequence based on the training dataset; performing a single forward pass using the first training sequence as input; and performing a set of backward passes from a subset of examples in the first training sequence, wherein each backward pass is conditioned on a selected subset of prompt/completion examples in the first training sequence, wherein performing multiple backward passes conditioned on the selected prompt/completion examples in the first training sequence improves the language model's ability to generate a higher quality conditional probability distribution for a next token without incurring additional training time, wherein constructing the first training sequence based on the training dataset includes: selecting from the set of K prompt/completion examples, a set of N prompt/completion examples, wherein [N £ K] N≤K and the combined size of the selected N prompt/completion examples is equal to or less than the predetermined size of the context window; and concatenating the selected set of N prompt/completion examples to form the first training sequence, and wherein while performing the single forward pass, the method further comprises: specifying a set of loss masks within the training sequence for the set of backward passes, wherein each loss mask in the set of loss masks is a unique example in the set of N prompt/completion examples to begin a backward pass; and specifying a set of attention masks for the set of loss masks, wherein each attention mask in the set of attention masks specifies, during a backward pass from a corresponding loss mask, a subset of prompt/completion examples within the training sequence for the backward pass to be conditioned on.

2. The method of claim 1, wherein performing the single forward pass using the first training sequence includes:

calling the transformer-based language model; and passing the first training sequence through the transformer-based language model to generate a next token prediction based on the first training sequence.

3. The method of claim 1, wherein each loss mask in the set of loss masks is one of the N completions in the set of N prompt/completion examples; and wherein the set of loss masks is composed of a subset of the N completions in the set of N prompt/completion examples.

4. The method of claim 1, wherein the set of loss masks is composed of the set N completions in the set of N prompt/completion examples.

5. The method of claim 1, wherein a specified attention mask for a corresponding loss mask includes each and every prompt/completion example in the first training sequence preceding the corresponding loss mask.

6. The method of claim 1, wherein a specified attention mask for a corresponding loss mask includes both a first subset of prompt/completion examples in the first training sequence preceding the corresponding loss mask and a second subset of prompt/completion examples in the first training sequence succeeding the corresponding loss mask.

7. The method of claim 1, wherein performing a backward pass in the set of backward passes includes performing a backpropagation from a corresponding loss mask conditioned on each and every prompt/completion example in the first training sequence preceding the corresponding loss mask, thereby effectively performing a few-shot training on the corresponding loss mask.

8. The method of claim 1, wherein the set of backward passes includes N backward passes, and wherein each of the N backward passes includes performing a backpropagation from each of the N completions in the set of N prompt/completion examples conditioned on each and every prompt/completion example in the first training sequence preceding the corresponding completion, thereby performing multiple different few-shot trainings on the set of loss masks.

9. The method of claim 1, wherein after performing the set of backward passes using the first training sequence, the method further comprises:

determining if there are unselected prompt/completion examples in the training dataset after constructing the first training sequence; and in response to determining that there are unselected prompt/completion examples, constructing a second training sequence from the unselected prompt/completion examples in the set of K prompt/completion examples; and performing a second training pass based the second training sequence.

10. The method of claim 9, wherein performing the second training pass includes:

performing a single forward pass using the second training sequence as input; and performing a set of backward passes from a subset of examples in the second training sequence, wherein each backward pass is conditioned on a selected subset of prompt/completion examples in the second training sequence.

11. The method of claim 1, wherein a total training time for the transformer-based language model based on the training dataset is proportional to a number of forward passes, which is determined by a number of unique training sequences constructed from the training dataset.

12. The method of claim 11, wherein the method further comprises reducing the total training time by reducing the number of unique training sequences, wherein reducing the number of unique training sequences includes maximizing the usage of the context window.

13. An apparatus for performing in-context few-shot training for a transformer-based language model, the apparatus comprising: one or more processors; a memory coupled to the one or more processors, the memory storing instructions that, when executed by the one or more processors, cause the apparatus to; receive the transformer-based language model having a context window of a predetermined size; receive a training dataset comprising a set of K prompt/completion examples; construct a first training sequence based on the training dataset; perform a single forward pass using the first training sequence as input; and perform a set of backward passes from a subset of examples in the first training sequence, wherein each backward pass is conditioned on a selected subset of prompt/completion examples in the first training sequence, wherein performing multiple backward passes conditioned on the selected prompt/completion examples in the first training sequence improves the language model's ability to generate a higher quality conditional probability distribution for a next token without incurring additional training time, wherein constructing the first training sequence based on the training dataset includes: selecting from the set of K prompt/completion examples, a set of N prompt/completion examples, wherein [N £ K] N≤K and the combined size of the selected N prompt/completion examples is equal to or less than the predetermined size of the context window; and concatenating the selected set of N prompt/completion examples to form the first training sequence, and wherein while performing the single forward pass, the method further comprises: specifying a set of loss masks within the training sequence for the set of backward passes, wherein each loss mask in the set of loss masks is a unique example in the set of N prompt/completion examples to begin a backward pass; and specifying a set of attention masks for the set of loss masks, wherein each attention mask in the set of attention masks specifies, during a backward pass from a corresponding loss mask, a subset of prompt/completion examples within the training sequence for the backward pass to be conditioned on.

14. The apparatus of claim 13, wherein the memory further stores instructions that, when executed by the one or more processors, cause the apparatus to perform the single forward pass by:

calling the transformer-based language model; and passing the first training sequence through the transformer-based language model to generate a next token prediction based on the first training sequence.

15. The apparatus of claim 13, wherein the memory further stores instructions that, when executed by the one or more processors, cause the apparatus to perform a backward pass in the set of backward passes by performing a backpropagation from a corresponding loss mask conditioned on each and every prompt/completion example in the first training sequence preceding the corresponding loss mask, thereby effectively performing a few-shot training on the corresponding loss mask.

16. The apparatus of claim 13, wherein the set of backward passes includes N backward passes, and wherein each of the N backward passes includes performing a backpropagation from of each of the N completions in the set of N prompt/completion examples conditioned on each and every prompt/completion example in the first training sequence preceding the corresponding completion, thereby performing multiple different few-shot trainings on the set of loss masks.

* * * * *